US009633229B2

(12) United States Patent
Miyajima

(10) Patent No.: US 9,633,229 B2
(45) Date of Patent: Apr. 25, 2017

(54) SEMICONDUCTOR DEVICE MODULE, LICENSE SETTING METHOD AND MEDIUM HAVING LICENSE SETTING PROGRAM RECORDED THEREIN

(71) Applicant: Kabushiki Kaisha Toshiba, Minato-ku, Tokyo (JP)

(72) Inventor: Shingo Miyajima, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 66 days.

(21) Appl. No.: 14/847,146

(22) Filed: Sep. 8, 2015

(65) Prior Publication Data
US 2016/0132698 A1 May 12, 2016

(30) Foreign Application Priority Data

Nov. 7, 2014 (JP) .................................. 2014-227451
Sep. 2, 2015 (JP) .................................. 2015-172607

(51) Int. Cl.
G06F 21/00 (2013.01)
G06F 21/70 (2013.01)
G06F 12/02 (2006.01)
G06F 21/10 (2013.01)

(52) U.S. Cl.
CPC .......... *G06F 21/70* (2013.01); *G06F 12/0238* (2013.01); *G06F 21/10* (2013.01); *G06F 2212/1052* (2013.01)

(58) Field of Classification Search
CPC ...... G06F 21/10; G06F 21/70; G06F 12/0238; G06F 2212/1052
See application file for complete search history.

(56) References Cited

U.S. PATENT DOCUMENTS

| 7,063,253 | B1 * | 6/2006 | Brausch | G06F 21/10 235/379 |
| 7,325,139 | B2 * | 1/2008 | Ishiguro | G06F 21/10 713/168 |
| 8,261,082 | B1 * | 9/2012 | Goldman | H04L 9/3247 713/176 |
| 8,672,224 | B2 * | 3/2014 | Lebaschi | G06K 7/0004 235/454 |

(Continued)

FOREIGN PATENT DOCUMENTS

| JP | 2006-195672 A | 7/2006 |
| JP | 4454280 B2 | 4/2010 |

(Continued)

*Primary Examiner* — Beemnet Dada
(74) *Attorney, Agent, or Firm* — White & Case LLP

(57) ABSTRACT

A semiconductor device module according to embodiments includes a specific information storage unit configured to store individual identification information and class information, a control unit configured to perform authentication processing of maintenance information with signature signed using the class information, generate license information with signature signed using the individual identification information, the license information being based on the maintenance information, and store the license information with signature in a non-volatile memory, and a register to which a setting value based on the license information is set by the control unit.

19 Claims, 11 Drawing Sheets

(56) References Cited

U.S. PATENT DOCUMENTS

| | | | | |
|---|---|---|---|---|
| 9,246,688 | B1* | 1/2016 | Stickle | H04L 9/3247 |
| 2011/0004761 | A1* | 1/2011 | Thackray | H04L 9/3247 |
| | | | | 713/171 |

FOREIGN PATENT DOCUMENTS

| | | | |
|---|---|---|---|
| JP | 4506747 | B2 | 7/2010 |
| JP | 2012-014722 | A | 1/2012 |
| JP | 5692429 | B2 | 4/2015 |

* cited by examiner

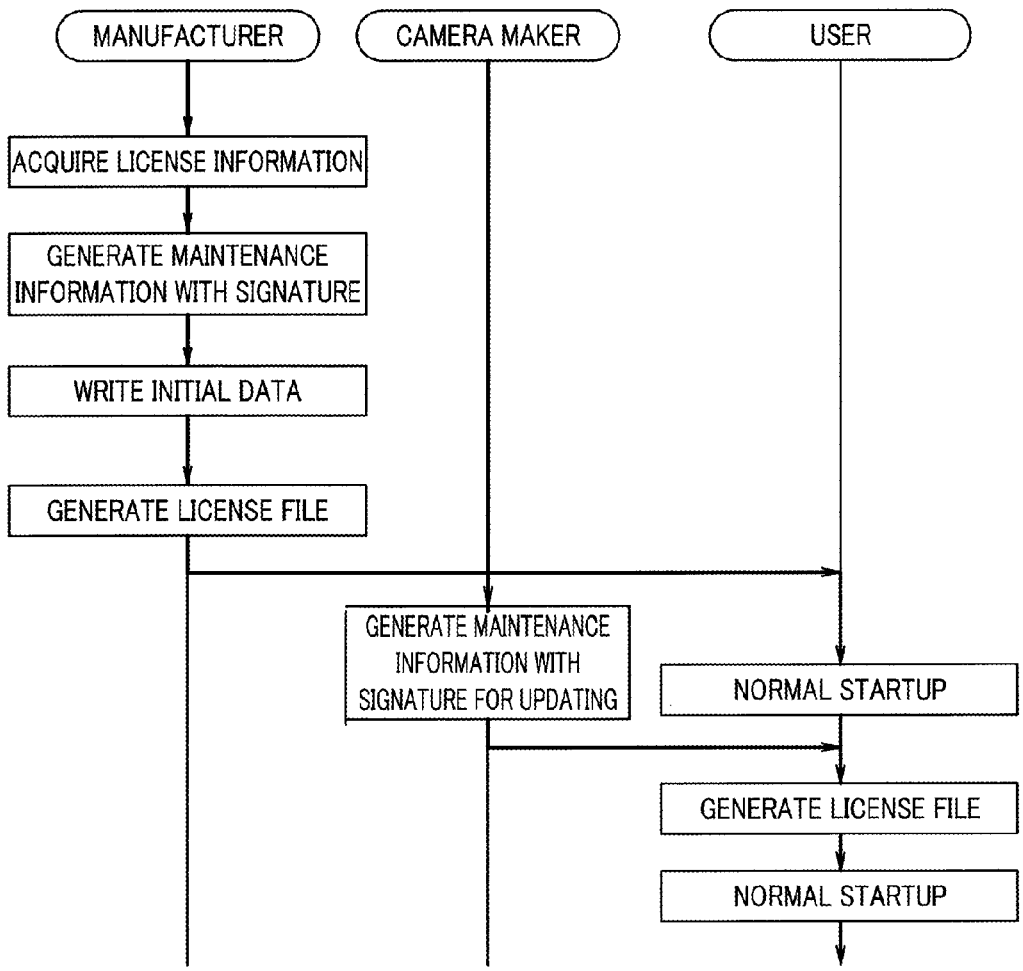
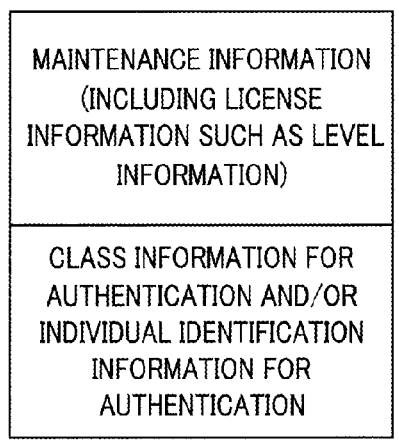

SEMICONDUCTOR DEVICE MODULE, LICENSE SETTING METHOD AND MEDIUM HAVING LICENSE SETTING PROGRAM RECORDED THEREIN

CROSS REFERENCE TO RELATED APPLICATIONS

This application is based upon claims benefit of Japanese Applications No. 2014-227451 filed in Japan on Nov. 7, 2014, and No. 2015-172607 filed in Japan on Sep. 2, 2015, the entire contents of each of which are incorporated herein by their reference.

FIELD

Embodiments described herein relate generally to a semiconductor device module, a license setting method and a medium having a license setting program recorded therein.

BACKGROUND

Conventionally, an SoC (system on chip) on which predetermined required functions are integrated on one semiconductor chip is mounted on various kinds of electronic equipment, or the like. For example, an SoC which implements image sharpening processing has been developed, and a semiconductor device module including this SoC may be mounted on a shooting device such as a camera.

By the way, in the semiconductor device such as an SoC, there is a case where license information is required to implement a plurality of functions mounted thereon. A licenser provides validity/invalidity of a function of a chip and a parameter such as a threshold to a user as license information, and the user, or the like, sets the license information to equipment. By this means, it is possible to limit a function which can be implemented at the equipment according to the license. For example, it is also possible to control only part of functions among all the functions which can be implemented at the semiconductor device according to license information. The semiconductor device reads out license information stored in, for example, a memory upon startup and implements various kinds of functions within a range allowed by the license information.

As a form of license, for example, there is a method in which image sharpening process is divided into a low level, a medium level and a high level according to a degree of sharpening, and a level which can be implemented at the semiconductor device is designated by the license information. For example, when the low level is designated by the license information, the semiconductor device can only execute a function of the low level of the image sharpening process. By incorporating such a semiconductor device module into a camera, the camera can implement image sharpening processing within a range according to the license.

In view of updating, or the like, of functions which can be implemented, the license information can be stored in a writable non-volatile memory, or the like, on the semiconductor device module. However, there is a problem that when the license information to be used at electronic equipment, or the like, of a user having authority (hereinafter, referred to as license target equipment) is copied and set to other electronic equipment, a function of a higher level may be implemented at the electronic equipment, or the like, of a user who does not originally have authority (hereinafter, non-license target equipment).

BRIEF DESCRIPTION OF THE DRAWINGS

FIG. 9 is an explanatory diagram describing action regarding license from when a semiconductor device module is manufactured until the semiconductor device module is utilized by a user in the second embodiment;

FIG. 10 is an explanatory diagram for explaining a maintenance file for updating;

DETAILED DESCRIPTION

A semiconductor device module according to embodiments includes a specific information storage unit configured to store individual identification information and class information, a control unit configured to perform authentication processing of maintenance information with signature signed using the class information, generate license information with signature signed using the individual identification information, the license information being based on the maintenance information, and store the license information with signature in a non-volatile memory, and a register to which a setting value based on the license information is set by the control unit.

Embodiments of the present invention will be described in detail below with reference to the drawings.

First Embodiment

Figure 1:
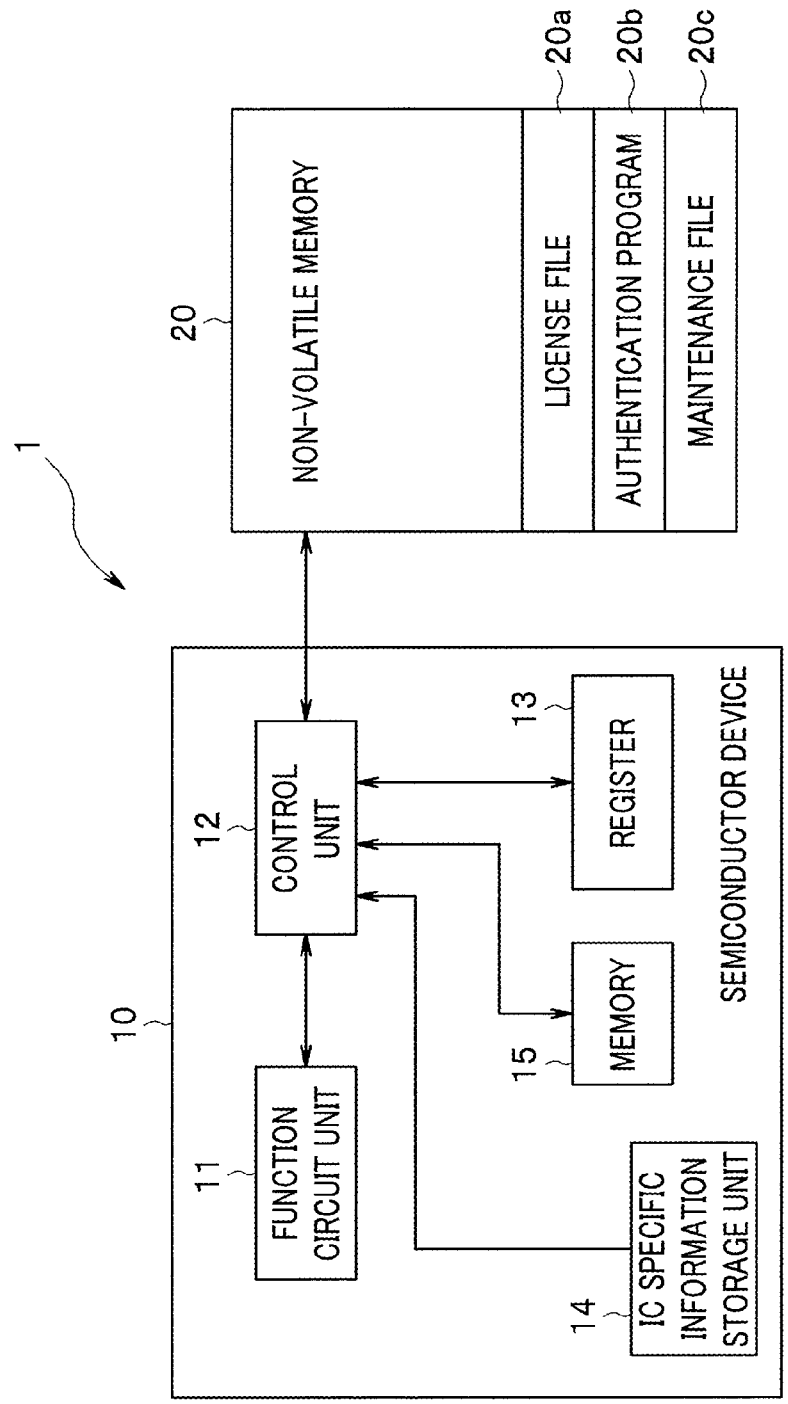
FIG. 1 is a block diagram illustrating a semiconductor device module according to a first embodiment of the present invention.

FIG. 1 is a block diagram illustrating a semiconductor device module according to a first embodiment of the present invention. In the present embodiment, license is set for each semiconductor device module, and license target equipment may include a semiconductor device module itself to which the license is set, in addition to equipment such as electronic equipment in which the semiconductor device module is incorporated.

As described above, the license information can be stored in a non-volatile memory, or the like, in the semiconductor device module. A processor, or the like, in the semiconductor device reads out the license information from the non-volatile memory and sets the license information to a register upon, for example, startup. Thereafter, the semiconductor device can implement functions designated by the license information using a value of this register.

In order to prevent the license information from being used at non-license target equipment which does not have authority (hereinafter, referred to as abuse), employing a method can be considered in which the license information is signed, and, if the license information cannot be authenticated at the semiconductor device, it is not allowed to use the license information. For example, an IC specific information storage unit such as an electronic fuse which is one time programmable is provided on the semiconductor device, and identification information specific to each semiconductor device module (hereinafter, referred to as individual identification information) is stored in the IC specific information storage unit. The license information is signed using this individual identification information. A licenser stores the license information signed using the individual identification information of each semiconductor device module in a non-volatile memory of each semiconductor device module upon, for example, manufacturing of the semiconductor device module.

A processor of the semiconductor device authenticates the license information signed using the individual identification information stored in the IC specific information storage unit. The processor of the semiconductor device can neither authenticate license information nor perform setting according to the license information for other license target equipment. By this means, the license information for the license target equipment can be utilized only at the license target equipment.

However, this method requires generating and storing license information signed using specific individual identification information for each semiconductor device module. That is, it is necessary to manage manufacturing for each semiconductor device module, which significantly increases manufacturing cost.

Therefore, in the present embodiment, license is divided into a plurality of classes, and license information which can be authenticated for each class is used. For example, when license is divided into three classes of a class for which a function of a high level is allowed, a class for which a function of a medium level is allowed, and a class for which a function of a low level is allowed, by signing license information using three types of information corresponding to these three classes, it is possible to authenticate the license information for each class. If, for example, as a method for dividing the license into classes, license is divided into classes according to a way of limiting a function, generally, the number of classes may be significantly smaller than the number of semiconductor device modules to be shipped.

Various kinds of methods can be employed as the method for dividing license into classes. For example, it is also possible to employ a method in which license is divided into five classes, and license information which can be authenticated is generated for each company for semiconductor device modules provided to company A to company E. If the number of classes of the license is sufficiently smaller than the number of semiconductor device modules to be shipped, it is possible to significantly reduce cost upon manufacturing including generation of license information and storage of license information in a non-volatile memory.

In FIG. 1, the semiconductor device module 1 has a semiconductor device 10 such as an SoC and a non-volatile memory 20. In the present embodiment, in the non-volatile memory 20, at least a license information storage region 20a in which a license file including license information is stored and a maintenance information storage region 20c in which a maintenance file including maintenance information is stored are provided. Further, the non-volatile memory 20 may have a program storage region 20b in which an authentication program is stored.

In the present embodiment, in order to perform updating, or the like, which will be described later, instead of license information being directly written in the non-volatile memory 20 upon manufacturing of the semiconductor device module 1, a maintenance file for generating the license information is stored in the maintenance information storage region 20c. Further, as will be described later, in the license information storage region 20a, a license file generated based on the maintenance file stored in the maintenance information storage region is stored.

The semiconductor device 10 has a function circuit unit 11 configured to implement a predetermined function and a control unit 12. The control unit 12 may be configured with, for example, a processor such as a CPU, and may operate using a memory 15 as a work memory according to a program stored in a ROM which is not illustrated or a memory 15. The control unit 12 performs processing such as processing of authenticating a maintenance file to generate a license file, processing of storing the license file in the non-volatile memory 20, processing of reading out the license file stored in the non-volatile memory 20 and storing setting information based on the license information in a register 13, and processing of controlling the function circuit unit 11 based on the setting information stored in the register 13. Note that the control unit 12 may execute these processes according to a program supplied as a firmware. Note that the function circuit unit 11 may directly refer to the setting information in the register 13 without using the control unit 12.

Note that the control unit 12 executes processing of authenticating the maintenance file and generating and storing a license file based on the authentication program stored in the non-volatile memory 20. The authentication program can implement secure boot by being authenticated by other authentication systems. Note that the authentication program does not have to be stored in the non-volatile memory 20, and may be read out from outside of the semiconductor device module 1 and stored in a ROM, or the like, which is not illustrated, in the semiconductor device module 1. When the authentication program is taken in from outside, it is necessary to employ a configuration in which tampering verification can be performed.

The register 13 stores setting information based on the license information. For example, the setting information includes information such as information of a function level which specifies to which level a function of the function circuit unit 11 is to be limited.

The function circuit unit 11 which is configured with hardware implementing a predetermined function, is controlled by the control unit 12 and operates at a function level based on the setting information stored in the register 13. For example, the function circuit unit 11 is configured with a circuit which executes image sharpening processing, and a level of the image sharpening processing is limited according to the function level based on the license information.

Further, the function circuit unit 11 is not limited to one which implements processing with hardware, and may be one which implements processing through software processing. Further, while, in the function circuit unit 11, a function for which operation is determined according to license is implemented with hardware, the function circuit unit 11 may be configured with auxiliary software (such as a device driver) for processing which does not involve license. In that case, it is preferable to implement the processing so as to be able to verify tampering of software or so as not to be able to change the register 13 from the function circuit unit 11. That is, it is configured so that only the control unit 12 can perform setting on the register 13 based on the license. It is obvious that a level of software processing can be also limited according to the license information even when the function circuit unit 11 is configured with software. Note that while it is relatively difficult for a user to perform tampering when the function circuit unit 11 implements the function with hardware, because it is relatively easy to tamper with software when the function is implemented with software, it is preferable to separately provide a function for protecting software itself against tampering, or the like.

Note that the function of the function circuit unit 11 is not limited to the image sharpening processing. For example, the function circuit unit 11 may execute noise reduction processing, where a level of noise reduction can be limited according to the license information. Further, the license information is not only used to control the function circuit unit 11, but may be used to control the whole of the semiconductor device module 1. For example, the license information may be information for limiting resource such as limiting operation speed of the semiconductor device 10.

The IC specific information storage unit 14 which is an information holding unit configured with hardware on the semiconductor device 10, can store information upon manufacturing, or the like. Note that because information is written in the hardware physically in the IC specific information storage unit 14, ordinarily, it is considered to be impossible to tamper with the information stored therein.

Figure 2:
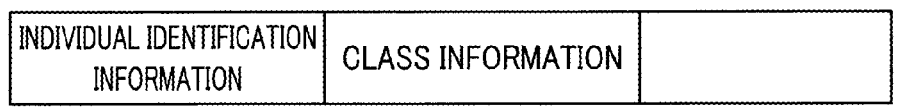
FIG. 2 is an explanatory diagram for explaining information stored in an IC specific information storage unit 14.

FIG. 2 is an explanatory diagram for explaining information stored in the IC specific information storage unit 14. In the present embodiment, respective semiconductor device modules 1 are classified into a plurality of classes corresponding to classes of the license. As illustrated in FIG. 2, in the IC specific information storage unit 14, information which can be identified for each class (hereinafter, referred to as class information) is stored. Further, in the IC specific information storage unit 14, individual identification information specific to each semiconductor device module 1 is also stored.

A manufacturer of the semiconductor device module 1 provides a maintenance file which can be authenticated for each class of the license to each semiconductor device module 1. To enable authentication, the manufacturer of the semiconductor device module 1 generates a maintenance file including maintenance information with signature by signing the information according to the license using the class information.

Figure 3:
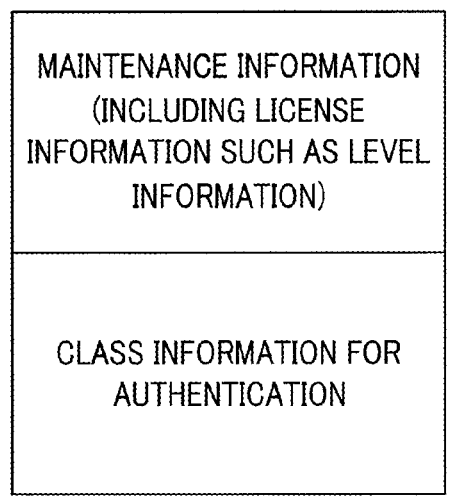
FIG. 3 is an explanatory diagram for explaining information included in a maintenance file.

FIG. 3 is an explanatory diagram for explaining information included in the maintenance file. As illustrated in FIG. 3, the maintenance file includes maintenance information for generating license information which is set to a predetermined class. For example, the maintenance information includes license information such as level information indicating the above-described function level such as a low level, a medium level and a high level. Further, the maintenance file includes class information for authentication.

The manufacturer of the semiconductor device module stores the generated maintenance file in the non-volatile memory 20 on the semiconductor device module 1 of the corresponding class.

Note that while the individual identification information specific to each semiconductor device module 1 cannot be known until after each semiconductor device 10 is manufactured, the class information can be determined in advance before the semiconductor device 10 is manufactured. It is therefore relatively easy to manage steps of storing the class information in the IC specific information storage unit 14, generating a maintenance file including maintenance information signed using the class information and storing the maintenance file in the non-volatile memory 20. Moreover, as described above, each semiconductor device module 1 does not have to be managed individually upon manufacturing, and only has to be managed for each class, which may reduce manufacturing cost.

In the present embodiment, the control unit 12 authenticates the maintenance file (hereinafter, also referred to as class authentication) using the class information stored in the IC specific information storage unit 14 based on an authentication program. When the class information stored in the IC specific information storage unit 14 matches the class information for authentication included in the maintenance file, the control unit 12 determines that class authentication of the maintenance file read out from the non-volatile memory 20 is successful. For the maintenance information performed class authentication, the control unit 12 generates license information obtained from the maintenance information based on the authentication program and signs the generated license information using the individual identification information stored in the IC specific information storage unit 14. The control unit 12 stores the license information signed using the individual identification information (hereinafter, referred to as license information with signature) in the license information storage region of the non-volatile memory 20 as a license file based on the authentication program.

Figure 4:
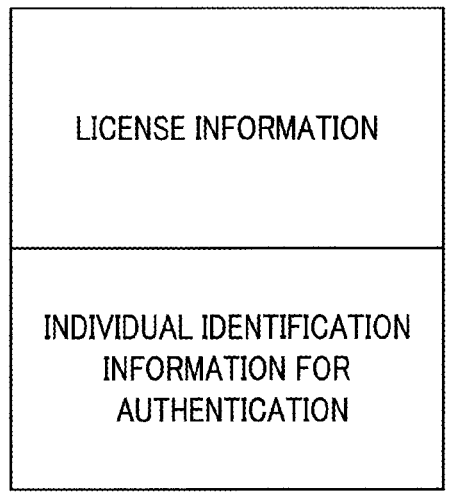
FIG. 4 is an explanatory diagram for explaining information included in a license file.

FIG. 4 is an explanatory diagram for explaining information included in the license file. As illustrated in FIG. 4, the license file includes license information and individual identification information for authentication. The control unit 12 can authenticate the license file (hereinafter, referred to as individual authentication) using the individual identification information stored in the IC specific information storage unit 14 based on the authentication program.

Note that in the above-described class authentication and individual authentication, an existing authentication technique can be employed. For example, the control unit 12 can generate signature information (class information for authentication or individual identification information for authentication) indicating validity of data using the class information or the individual identification information as a key by employing CiperMAC, or the like, in the authentication program. The control unit 12 can, then, authenticate that these signature information are generated based on the class information or the individual identification information using the authentication program.

Further, for example, the control unit 12 can also generate and authenticate signature information using public key cryptography using an RSA, elliptic curve cryptography, or the like. In this case, for example, a public key generated by a licenser can be included in the authentication program, and the maintenance file can be signed using a secret key.

The control unit 12 may delete the maintenance file stored in the maintenance information storage region based on the authentication program after the license information with signature is stored in the license information storage region 20*a*. Because the license information with signature stored in the license information storage region 20*a* is signed using the individual identification information stored in the IC specific information storage unit 14 of each semiconductor device, it is impossible to perform authentication at another semiconductor device module 1. It is therefore impossible to copy the license information with signature stored in the license information storage region 20*a* and abuse the license information at other semiconductor device module 1.

Note that because the maintenance file stored in the maintenance information storage region 20*c* can be authenticated only at the semiconductor device module 1 of the same class, even if the maintenance information is copied and utilized at other semiconductor device module 1, there may be substantially no real damage on the license. Therefore, after the license information with signature is stored in the license information storage region 20*a*, the maintenance file stored in the maintenance information storage region 20*c* may be left without being deleted.

Figure 5:
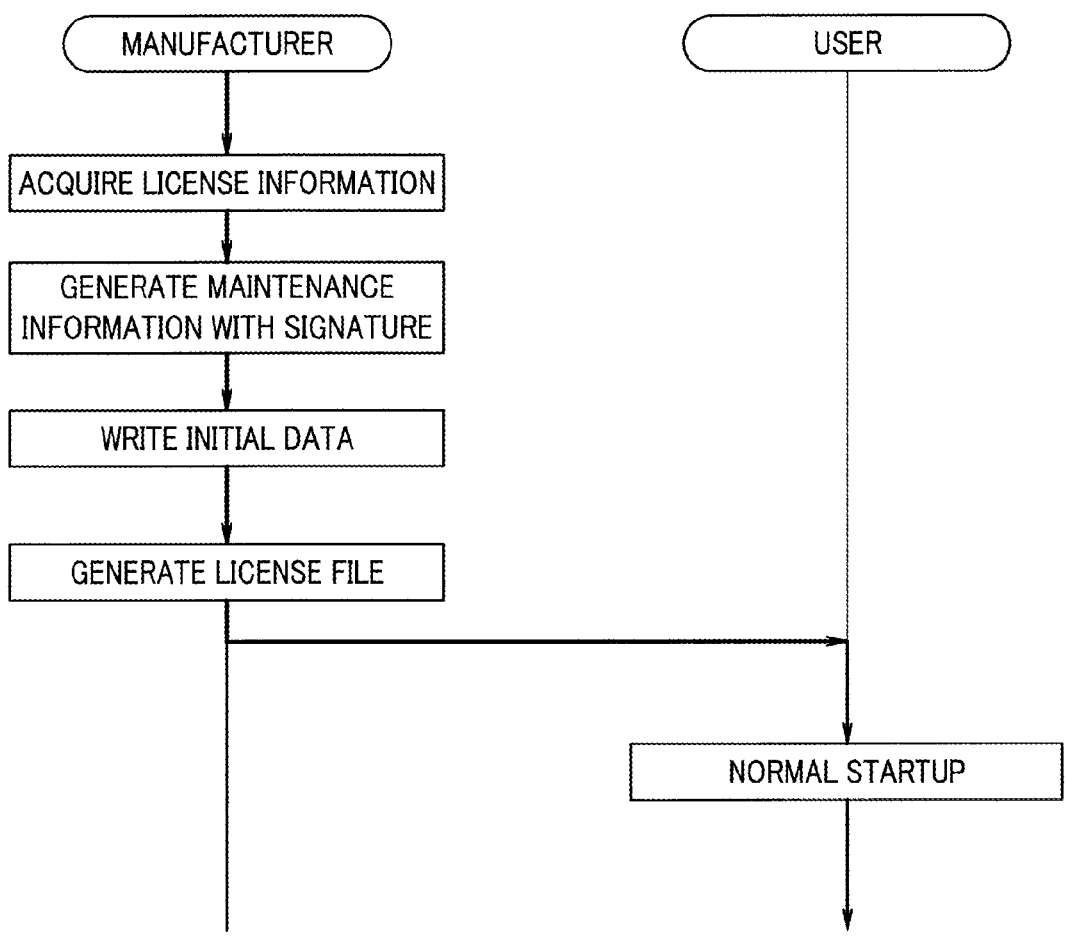
FIG. 5 is an explanatory diagram describing action regarding license from when a semiconductor device module is manufactured until the semiconductor device module is utilized by a user.
Figure 6:
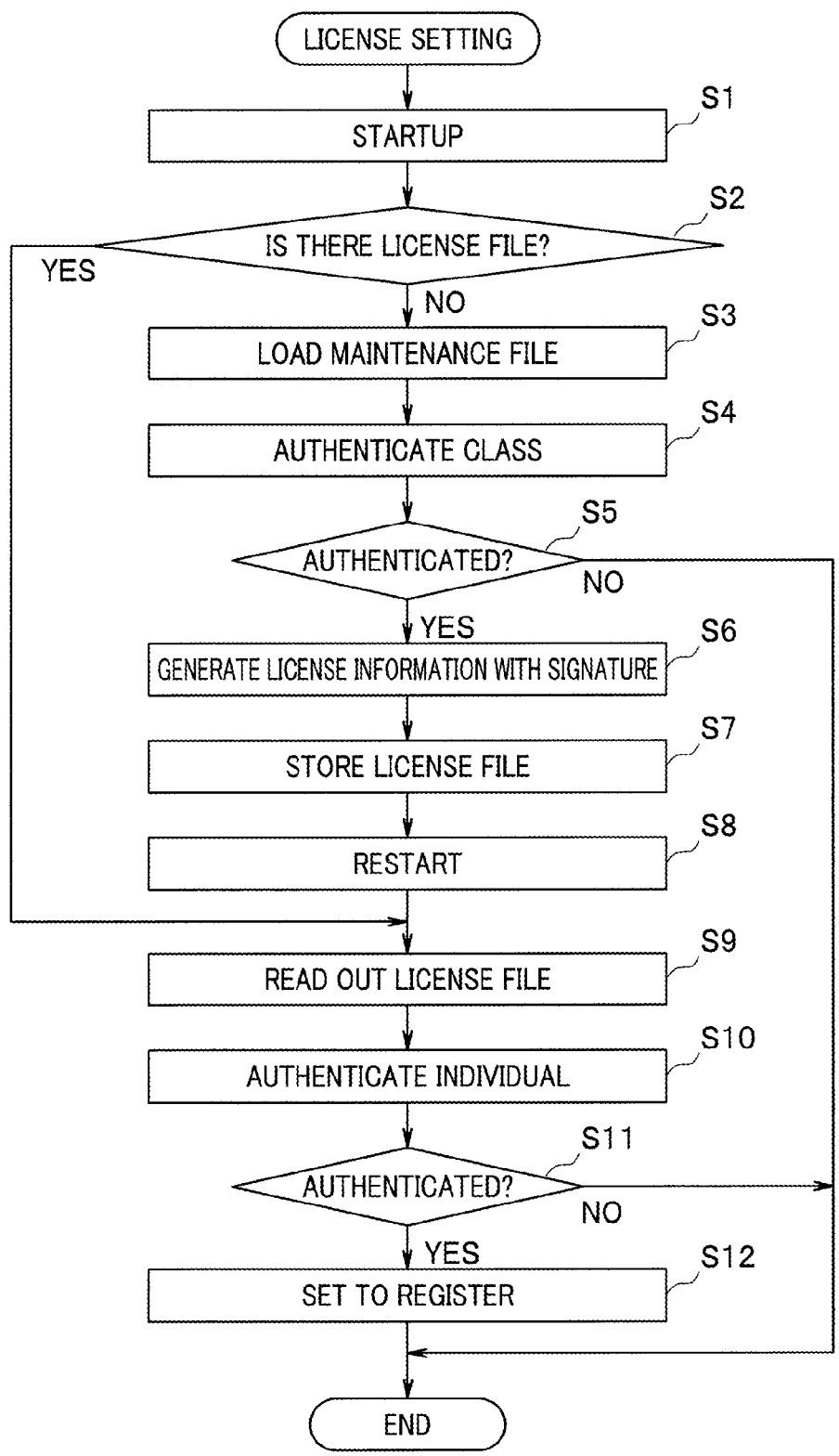
FIG. 6 is a flowchart illustrating license setting by a control unit 12.

Operation of the embodiment configured as described above will be explained next with reference to FIG. 5 and FIG. 6. FIG. 5 is an explanatory diagram describing action regarding license from when the semiconductor device module is manufactured until the semiconductor device module is utilized by the user, and FIG. 6 is a flowchart illustrating license setting by the control unit 12.

As illustrated in FIG. 5, the manufacturer acquires license information according to each class of the license. The license information of each class is set to the semiconductor device module 1 of the corresponding class. Note that the license information may be generated according to requirements from a trading company, or the like, which sells the semiconductor device module 1 to the user.

The manufacturer signs the maintenance information for generating the license information set for each class of the semiconductor device module 1 using class information for specifying the class to generate maintenance information with signature. The manufacturer writes the generated maintenance information with signature as a maintenance file in the maintenance information storage region 20*c* of the non-volatile memory 20 of the corresponding semiconductor device module 1 upon initial data writing in FIG. 5. Note that the manufacturer also writes the authentication program in the authentication program storage region 20*b* of the non-volatile memory 20 upon initial data writing.

Note that while not illustrated in FIG. 5, manufacturing of the semiconductor device 10 including writing of information in the IC specific information storage unit 14 is completed until the license file is generated.

In a stage of initial data writing, a license file is not stored in the non-volatile memory 20. It is necessary to store the license file in the license information storage region 20*a* of the non-volatile memory 20 upon normal startup by the user. Therefore, FIG. 5 illustrates an example where the manufacturer writes the license file. Note that it is obvious that the user may write the license file after the semiconductor device module 1 is shipped.

FIG. 6 illustrates a flow which can be employed upon generation of the license file in FIG. 5. The flow in FIG. 6 illustrates processing by the control unit 12 in the semiconductor device 10 and includes processing of two modes of an initial maintenance mode in which the license file is generated in FIG. 5 and a normal mode in which license authentication is performed upon normal startup after the license file is generated. Steps S3 to S8 in FIG. 6 correspond to processing in the initial maintenance mode and steps S9 to S12 correspond to processing in the normal mode. Note that it is also possible to employ a configuration which allows initial maintenance mode to be executed independently.

In step S1 in FIG. 6, the semiconductor device module 1 is started. The control unit 12 loads the authentication program from the non-volatile memory 20 to execute processing regarding license. First, in step S2, the control unit 12 determines whether or not the license file is stored in the license information storage region 20*a*. Because the license file is not stored before the license file is generated in FIG. 5, the control unit 12 shifts the mode to the initial maintenance mode and loads the maintenance file from the non-volatile memory 20 (step S3).

The control unit 12 then reads out the class information stored in the IC specific information storage unit 14 and tries to perform class authentication of the maintenance file using the read class information (step S4). Because, upon initial writing, the maintenance information with signature signed using the class information stored in the IC specific information storage unit 14 is stored in the maintenance information storage region 20*c*, the control unit 12 successfully performs authentication. When the control unit 12 successfully performs authentication (step S5), the control unit 12 generates license information from the maintenance information included in the maintenance file, reads out the individual identification information stored in the IC specific information storage unit 14 and signs the license information using the individual identification information. In this manner, the control unit 12 generates the license information with signature (step S6) and stores the license information in the license information storage region 20*a* as a license file (step S7). The control unit 12 then restarts the semiconductor device 10 and finishes the initial maintenance mode. Note that it is not always necessary to restart the semiconductor device 10 while the license file is stored and read out, and restarting of the semiconductor device 10 may be omitted when the mode is continuously shifted from the initial maintenance mode to the normal mode.

In this manner, in the initial maintenance mode, a legitimate license file based on the maintenance file is generated and stored in the non-volatile memory 20. Note that even if the maintenance file is abusively stored in the non-volatile memory 20 due to leak of the maintenance file, or the like, when the class of the license does not match the class of the semiconductor device module, it is determined in step S5 that authentication of the maintenance file is failed. In this case, processing is finished without the license file being generated. Therefore, even if the maintenance file is leaked, it is possible to limit the semiconductor device module subject to influence, so that it is possible to reduce security risk.

After the semiconductor device module is shipped, or the like, the license file is stored in the license information storage region 20*a*, and the control unit 12 shifts the mode to the normal mode from step S2 to read out the license file (step S9). The control unit 12 then reads out the individual identification information stored in the IC specific information storage unit 14 and tries to perform individual authentication of the license file using the read individual identification information (step S10). Only when the license file includes the license information signed using the individual identification information stored in the IC specific information storage unit 14, the control unit 12 succeeds in authentication.

When the license file is legitimately written in the non-volatile memory 20 based on the authentication program, the control unit 12 succeeds in authentication. The control unit 12 determines whether or not authentication is successful in step S11, and if successful, writes setting information based on the license information included in the license file to the register 13 in step S12. Thereafter, the control unit 12 controls the operation of the function circuit unit 11 based on the setting information stored in the register 13.

On the other hand, when the license file acquired abusively is stored in the non-volatile memory 20, for example, the license information copied from other semiconductor device module 1 is written in the non-volatile memory 20, because the individual identification information for authentication included in the license file is different from the individual identification information read out from the IC specific information storage unit 14, the control unit 12 fails in authentication. In this case, processing is finished without the setting information being written in the register 13. Therefore, even when the license file is copied, or the like, it is possible to prevent abuse.

As described above, in the present embodiment, the license is divided into classes, and the semiconductor device modules are divided into classes corresponding to the classes of the license. Then, the maintenance information for generating the license information is signed using the class information indicating the class of each semiconductor device module, and the maintenance information with signature is stored in the semiconductor device module. On the other hand, the class information and the individual identification information specific to each semiconductor device module are stored in the semiconductor device, and the control unit authenticates the maintenance information using the class information. The maintenance file belonging to the same class can be authenticated only at the semiconductor device module belonging to the same corresponding class, and cannot be authenticated at the semiconductor device module belonging to other classes. By this means, it is possible to prevent abuse of the maintenance file.

Further, by signing the license information obtained from the authenticated maintenance information using the individual identification information of each semiconductor device module and generating and storing the license file, the license file can be authenticated only at the corresponding semiconductor device module thereafter. By this means, it is possible to further reliably prevent abuse of the license file.

Further, it is only necessary to write the maintenance file generated by signing the maintenance information using the class information which can be determined in advance before the semiconductor device is manufactured in the non-volatile memory, it is easy to manage steps upon manufacturing and it is only necessary to perform management in units of class, so that it is possible to reduce manufacturing cost.

Note that because the maintenance information with signature stored in the non-volatile memory 20 upon manufacturing can be used by way of class authentication, the maintenance information with signature can be utilized only at the semiconductor device module of the same class. Therefore, unless updating, or the like, which will be described later, is taken into account, the license information signed using the individual identification information does not have to be necessarily generated from the authenticated maintenance information, and it is also possible to generate and store the license information signed using the class information.

Second Embodiment

Figure 7:
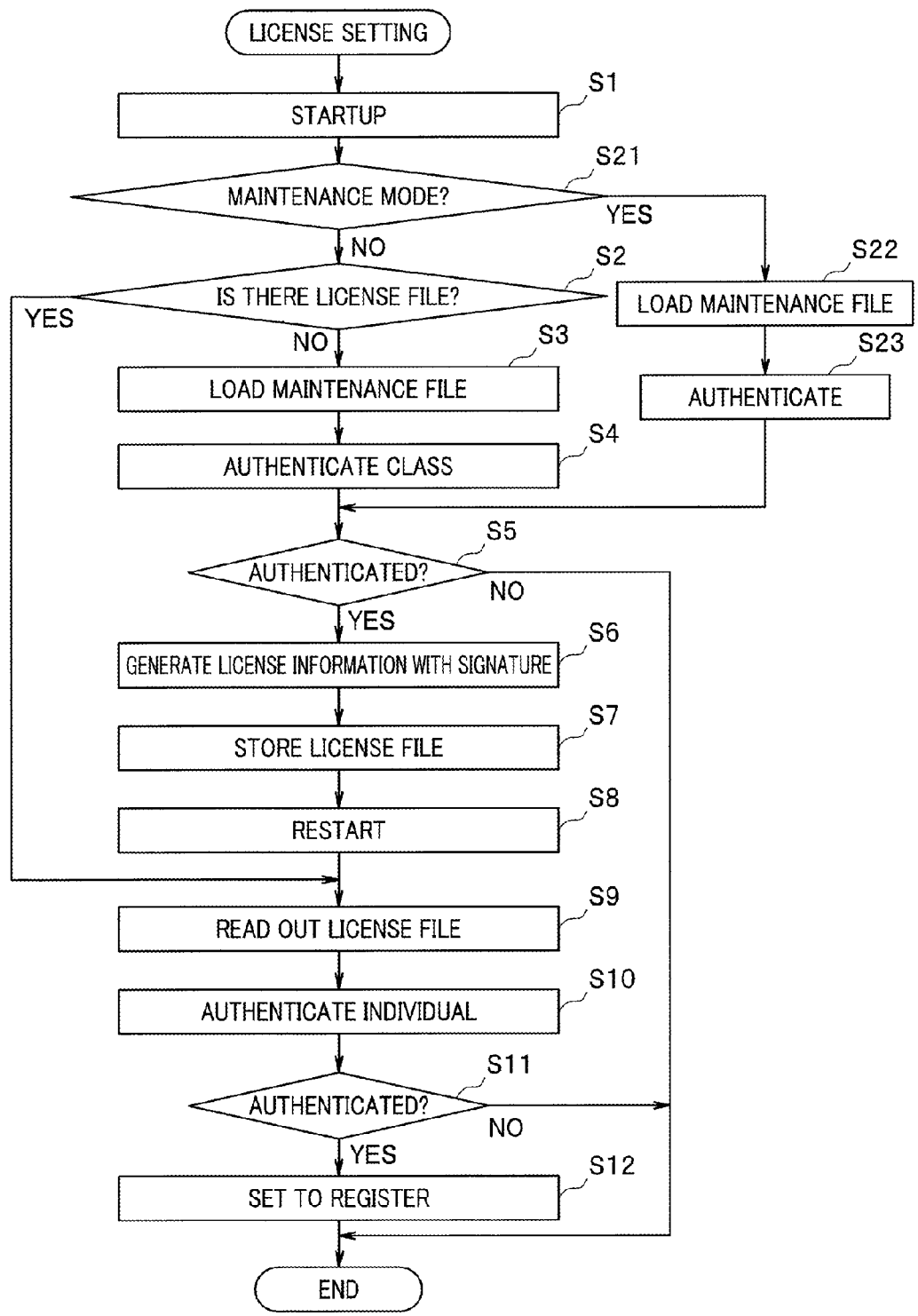
FIG. 7 is a flowchart illustrating an operation flow employed in a second embodiment of the present invention.
Figure 8:
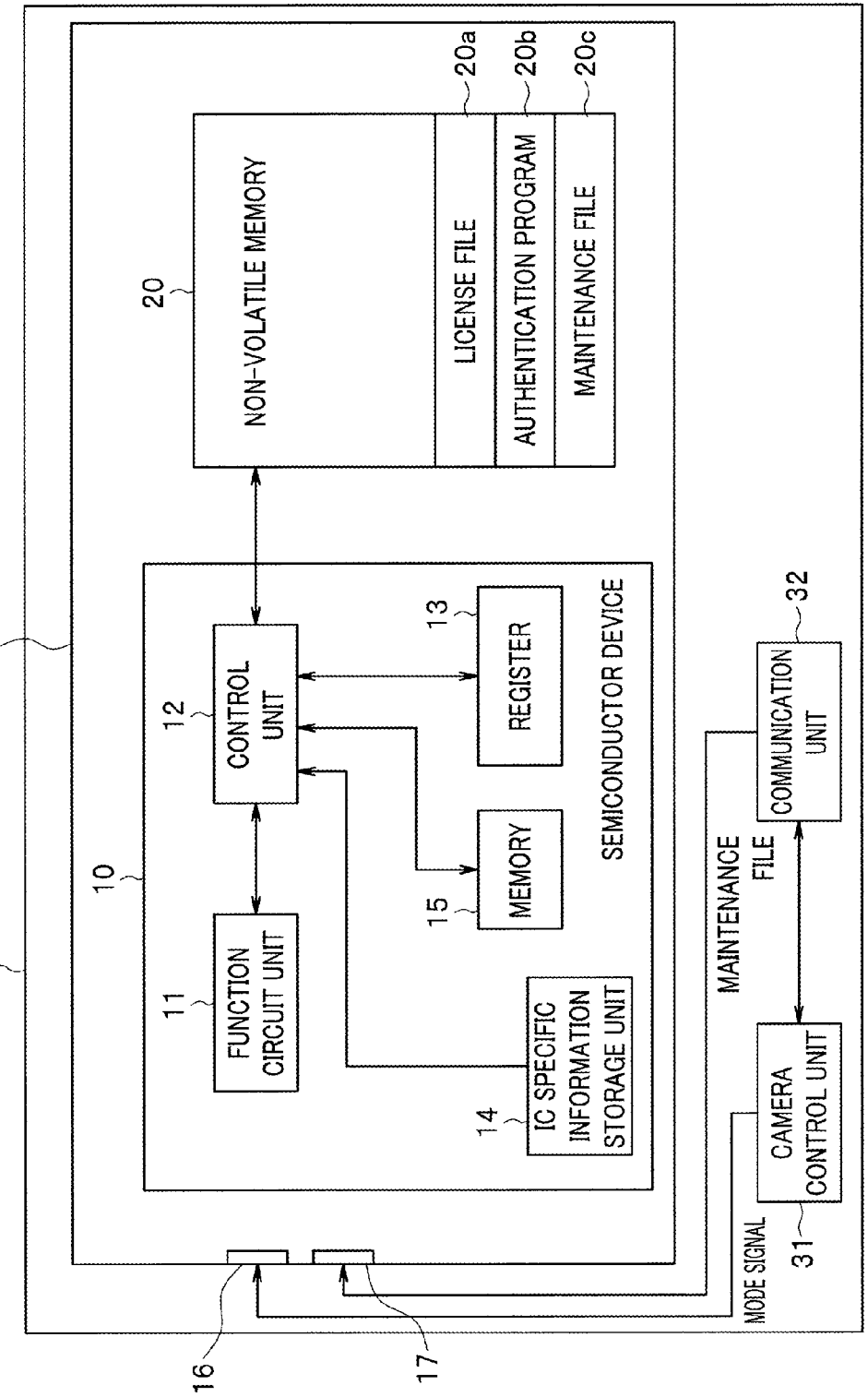
FIG. 8 is a block diagram illustrating a camera 30 in which a semiconductor device module 1 is incorporated.

FIG. 7 is a flowchart illustrating an operation flow employed in a second embodiment of the present invention. In FIG. 7, the same reference numerals are assigned to the procedure which is the same as those in FIG. 6, and explanation will be omitted. The present embodiment can be implemented with a similar hardware configuration to that of the first embodiment. FIG. 8 is a block diagram illustrating the camera 30 in which the semiconductor device module 1 is incorporated. In FIG. 8, the same reference numerals are assigned to components which are the same as those in FIG. 1, and explanation will be omitted.

The present embodiment enables updating, or the like, of the semiconductor device module 1 while reliably preventing abuse. Note that updating, or the like, means updating of content of the license, including updating, upgrade, version upgrade, downgrade, version downgrade, or the like. In the present embodiment, the semiconductor device module 1 takes in the maintenance information for updating the license file according to content of updating, or the like, from outside upon updating, or the like.

As illustrated in FIG. 8, the semiconductor device module 1 is provided with a terminal 16 into which a mode signal for designating a maintenance mode is inputted and a terminal 17 for taking in the maintenance file. The semiconductor device module 1 is incorporated into the camera 30. A camera control unit 31 and a communication unit 32 are provided in the camera 30. Note that while various kinds of circuit units relating shooting such as an image pickup unit, an image processing unit, a recording unit and a display unit are configured within the camera 30, illustration is omitted.

The camera control unit 31 can generate a mode signal for setting the maintenance mode based on user operation and output the mode signal to the terminal 16 of the semiconductor device module 1. Further, the communication unit 32 operates under control of the camera control unit 31. When the communication unit 32 receives a maintenance file from outside, the communication unit 32 can supply the received maintenance file to the semiconductor device module 1 via the terminal 17.

Note that while FIG. 8 illustrates an example where the camera control unit 31 generates a mode signal and provides the mode signal to the semiconductor device module 1 and the communication unit 32 receives a maintenance file from outside and provides the maintenance file to the semiconductor device module 1, a mode signal and a maintenance file to be provided to the semiconductor device module 1 may be acquired through any route. For example, it is possible to take in the maintenance file into the semiconductor device module 1 via various kinds of interfaces connected to the terminal 17, and, for example, it is possible to take in the maintenance file from a memory medium, a personal computer, or the like. Further, it is also possible to shift the mode to the maintenance mode by providing a switch, or the like, for setting the mode to the semiconductor device module 1 without providing the terminal 16.

FIG. 9 is an explanatory diagram describing action regarding license from when the semiconductor device module is manufactured until the semiconductor device module is utilized by the user in the second embodiment. The example in FIG. 9 is different from the example in FIG. 5 in that action of a camera maker generating maintenance information for updating and providing the maintenance information to the user and action of the user generating a license file to perform normal startup are added. Note that while FIG. 9 illustrates an example where the camera maker generates the maintenance information for updating, a manufacturer, a trading company, or the like, may generate the maintenance information for updating.

FIG. 10 is an explanatory diagram for explaining the maintenance file for updating. As illustrated in FIG. 10, the maintenance file for updating includes maintenance information for generating license information set to license target equipment of a predetermined user or a predetermined class. For example, the maintenance information includes license information such as level information indicating a function level such as a low level, a medium level and a high level as described above. Further, the maintenance file includes at least one of the class information for authentication and the individual identification information for authentication.

For example, when only a semiconductor device module 1 incorporated into the camera 30 of a specific individual is updated, the maintenance file includes at least individual identification information for authentication. Further, when the semiconductor device modules 1 in the same class are updated, the maintenance file includes only class information for authentication.

Because it is considered that a manufacturer, a camera maker or a seller such as a trading company recognizes class information for authentication, when the semiconductor device module 1 of a predetermined class is updated, they can obtain a maintenance file including the class information for authentication by signing the maintenance information for updating using the known class information.

Further, a manufacturer, a camera maker or a seller such as a trading company can acquire and manage individual identification information of the semiconductor device module 1 incorporated into the camera 30 of each user based on a serial number, or the like, of equipment registered by a user through registration, or the like, of a user who purchases the camera 30. In this case, the camera maker, or the like, can obtain a maintenance file including individual identification information for authentication by signing the maintenance information for updating using the individual identification information acquired from the user when the user requests updating, or the like.

Note that when the camera maker, or the like, does not manage the individual identification information of each user, it is also possible to employ a configuration which allows a user to read out the individual identification information of own equipment and provide the individual identification information of own equipment from the user to the camera maker, or the like. For example, the camera control unit 31 may control the control unit 12 of the semiconductor device 10 according to user operation to the camera 30, and the control unit 12 may transfer the individual identification information read out from the IC specific information storage unit 14 so as to make a display unit, which is not illustrated, of the camera 30 display the content.

The operation of the embodiment configured as described above will be explained next. The operation of the present embodiment is the same as the operation in the first embodiment in that before the user initially performs startup at a normal mode (normal startup), for example, a license file based on initial data writing is generated by execution of an initial maintenance mode by the manufacturer, and the user performs normal startup by utilizing this license file.

It is now assumed that a predetermined user requests updating to the camera maker, or the like. The camera maker, or the like, generates maintenance information for updating according to content of updating and acquires individual identification information of the semiconductor device module 1 incorporated into the camera 30 of the user from the registration information of the user who requests updating. The camera maker, or the like, signs the maintenance information using the acquired individual identification information to generate maintenance information with signature (maintenance information for updating with signature), and provides the maintenance information with signature to the user as a maintenance file for updating.

For example, the communication unit 32 of the camera 30 receives the maintenance file for updating from the camera maker, or the like, via a network which is not illustrated. The maintenance file for updating received by the communication unit 32 is supplied to the semiconductor device module 1 via the terminal 17. The control unit 12 stores the maintenance file for updating inputted via the terminal 17 in the memory 15.

The camera control unit 31 generates a mode signal for executing the maintenance mode according to, for example, user operation. This mode signal is provided to the semiconductor device module 1 via the terminal 16. When the mode signal for executing the maintenance mode is inputted via the terminal 16, the control unit 12 of the semiconductor device module 1 shifts the mode to the maintenance mode.

For example, the control unit 12 determines whether or not the maintenance mode is designated in step S21 in FIG. 7, and, if the maintenance mode is designated by the mode signal, the control unit 12 shifts processing to step S22 where the maintenance file for updating stored in the memory 15 is loaded. The control unit 12 performs authentication based on the authentication program (step S23). In this case, because the maintenance file for updating includes maintenance information signed using the individual identification information, the control unit 12 reads out the individual identification information stored in the IC specific information storage unit 14 and tries to authenticate the maintenance file for updating using the read individual identification information. When the individual identification information for authentication included in the maintenance file matches the individual identification information stored in the IC specific information storage unit 14, authentication is successful. If the individual identification information for authentication does not match the individual identification information stored in the IC specific information storage unit 14, authentication is failed.

The processing after step S5 is the same as the processing in the first embodiment. That is, after the maintenance file is successfully authenticated, the maintenance information for updating is acquired from the maintenance file, and license information is generated from the maintenance information. Further, the generated license information is signed using the individual identification information and stored in the license information storage region 20a of the non-volatile memory 20 as a license tile. The license file is updated in this manner, and, thereafter, setting information of the register 13 is updated based on the updated license information, and a function of the function circuit unit 11, or the like, is updated.

Note that when the control unit 12 determines that authentication is failed in step S5, the control unit 12 finishes the processing and does not perform updating. Because the maintenance file for updating includes the maintenance information signed using the individual identification information, the maintenance file for updating can be authenticated only at the semiconductor device module 1 incorporated into the camera 30 of the user who requests updating, and cannot be authenticated at other semiconductor device module 1. Therefore, updating can be reliably performed only at license target equipment, while updating cannot be performed at non-license target equipment.

Note that it is obvious that when the maintenance file for updating includes maintenance information signed only using class information, updating can be reliably performed only at license target equipment which belongs to the same class, while updating cannot be performed at non-license target equipment which does not belong to the same class.

Note that after the license file is updated, the control unit 12 may delete the maintenance file for updating stored in the memory 15. On the other hand, it can be considered that the maintenance file at the time of initial data writing is left stored in the non-volatile memory 20. In this case, even if the license file is deleted for some reason, it is possible to newly generate a license file based on the maintenance file in an initial state and operate the function circuit unit 11, or the like.

Further, for example, in the case where the license is classified into classes according to a function level, it is also possible to set the lowest function level as maintenance information to be used for initial data writing. In this case, the function level may be increased by updating. By setting the lowest function level to the maintenance file which can be left in the non-volatile memory 20, it is possible to minimize risk, and by using the maintenance information with signature signed using the individual identification information for updating, or the like, it is possible to guarantee reliable updating, or the like, to the license target equipment.

As described above, the present embodiment can provide the same advantages as those in the first embodiment, and a license file is updated using the maintenance information signed using at least one of the class information and the individual identification information in updating, or the like, so that it is possible to reliably perform updating only at the license target equipment.

Third Embodiment

Figure 11:
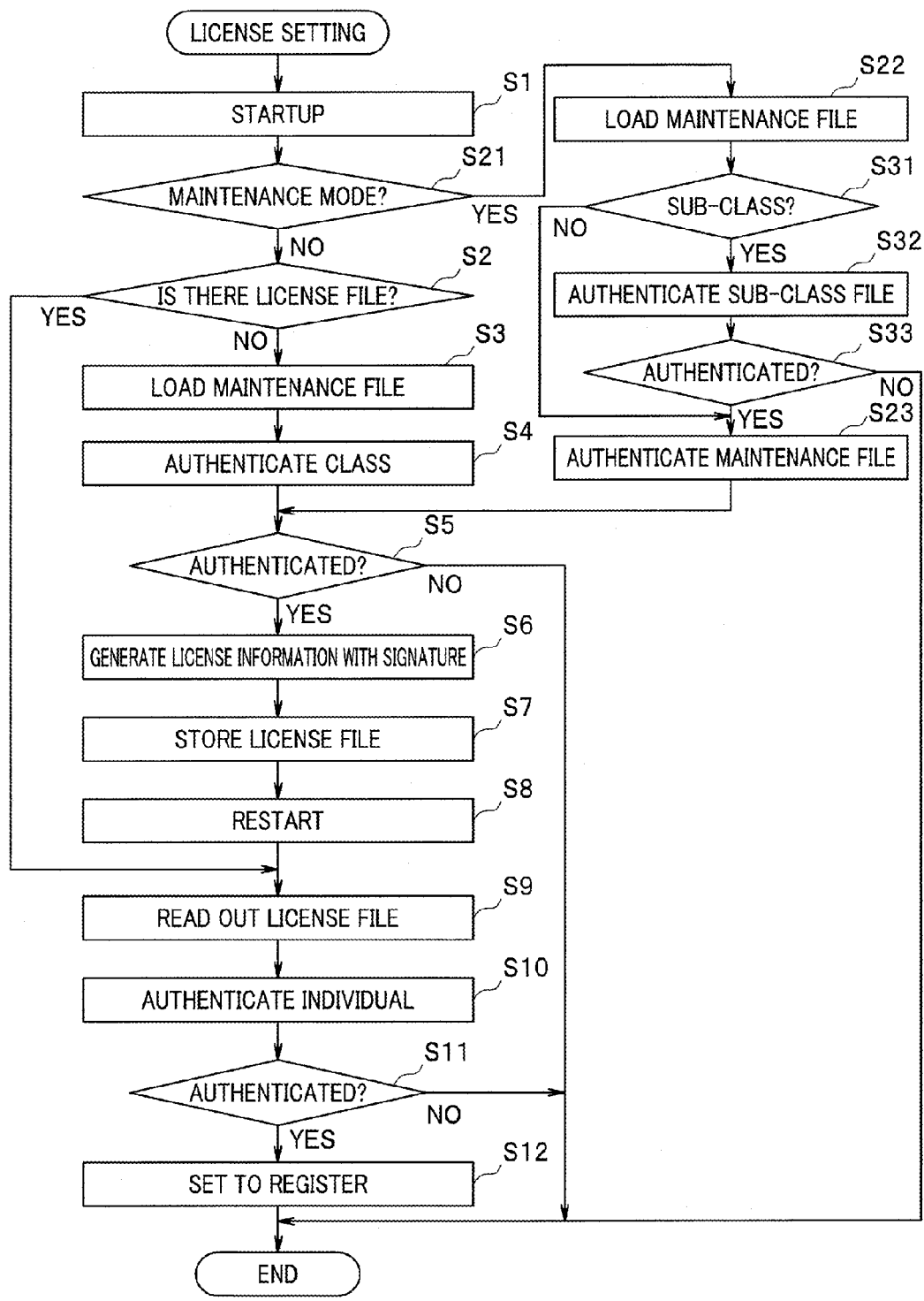
FIG. 11 is a flowchart illustrating an operation flow employed in a third embodiment of the present invention.

FIG. 11 is a flowchart illustrating an operation flow employed in a third embodiment of the present invention. In FIG. 11, the same reference numerals are assigned to the procedure which is the same as that in FIG. 7, and explanation will be omitted. The present embodiment can be implemented with a similar hardware configuration to those in the first and the second embodiments. The present embodiment will be explained also using the example in FIG. 8 where the semiconductor device module 1 is incorporated into the camera 30.

In the first and the second embodiments, reliable updating, or the like, was realized only at the individual license target equipment or the license target equipment for each class through individual authentication or class authentication. When the number of classes of the semiconductor device module 1 is relatively small, because there is a possibility that the number of semiconductor device modules 1 belonging to the same class becomes enormous, it may be difficult to employ updating for each class. Further, when a class for which the number of semiconductor device modules 1 belonging to the same class is reduced is newly set for items of a small number, it may bring disadvantage in terms of manufacturing cost.

Therefore, in the present embodiment, a sub-class for further classifying the semiconductor device modules 1 within the same class is newly set without changing the specification of class and class authentication same as those in the first and the second embodiments. In the present embodiment, the specification of the IC specific information storage unit 14 is not changed, and sub-class information is stored in the non-volatile memory 20.

Note that as sub-class information for specifying a sub-class, unique information which can be used not only to distinguish the sub-class from other sub-classes within the same class, but also to distinguish the sub-class from sub-classes in other classes is set. By signing the maintenance information using the sub-class information upon updating, or the like, it becomes possible to authenticate the maintenance file and update the license file only at the semiconductor device module 1 in the same sub-class for which the sub-class information is set.

However, there is a possibility that information within the non-volatile memory 20 may be tampered. Therefore, in the present embodiment, sub-class information with signature obtained by signing the sub-class information using the individual identification information stored in the IC specific information storage unit 14 is stored in the non-volatile memory 20 as a sub-class file.

Figure 12:
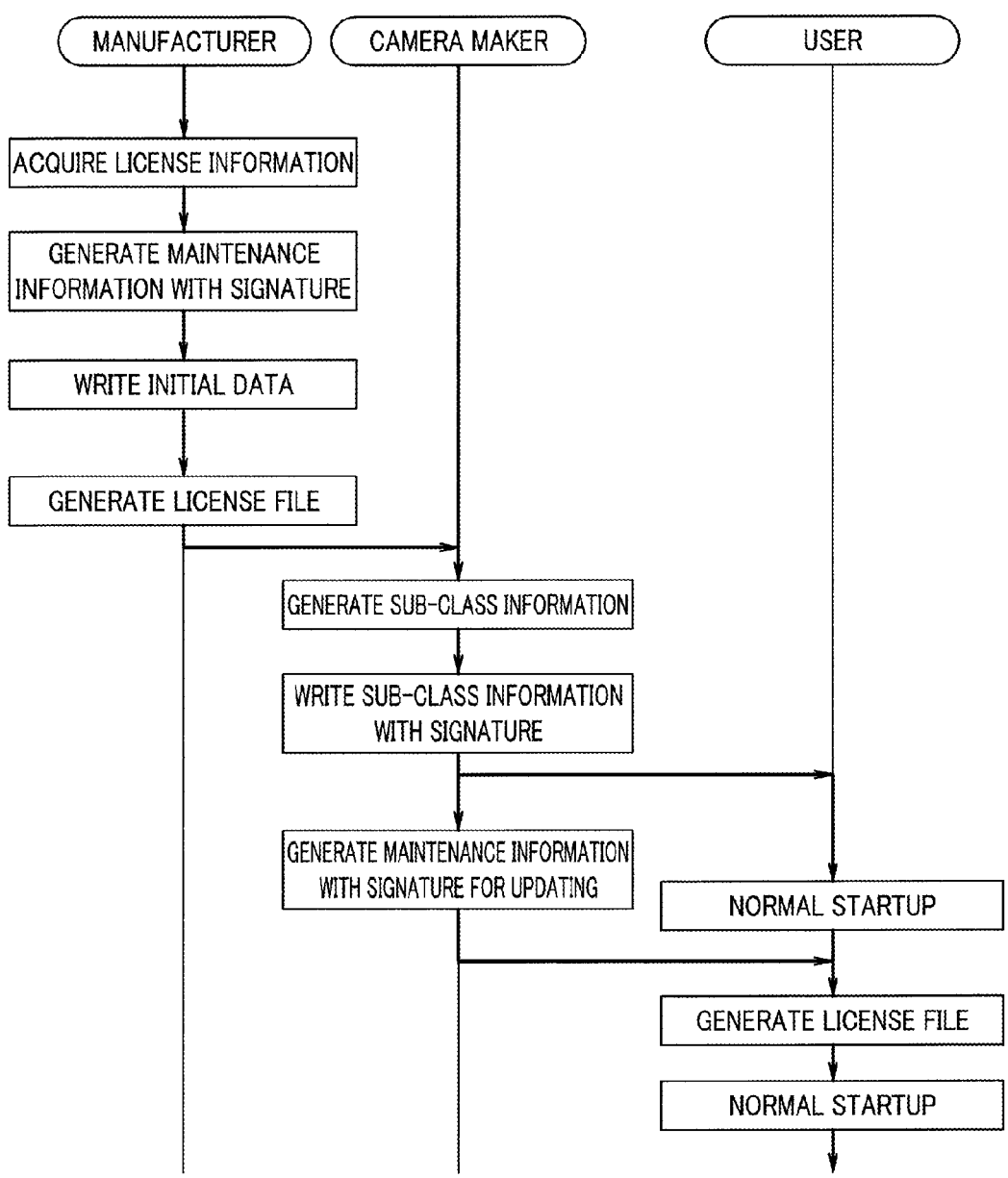
FIG. 12 is an explanatory diagram illustrating action regarding license from when a semiconductor device module is manufactured until the semiconductor device module is utilized by a user in the third embodiment.

FIG. 12 is an explanatory diagram describing action regarding license from when the semiconductor device module is manufactured until the semiconductor device module is utilized by a user in the third embodiment. The example in FIG. 12 is different from the example in FIG. 9 in that action is added that a camera maker generates sub-class information for the semiconductor device module 1 acquired from a manufacturer and writes sub-class information with signature, and, then, provide the sub-class information with signature to the user. Note that while FIG. 12 illustrates an example where the camera maker generates sub-class information and writes sub-class information with signature, a manufacturer, a trading company, or the like, may perform these actions. Further, the sub-class information with signature may be written any time after the initial data is written until the semiconductor device module is shipped to the user, and, for example, may be written before a license file is generated.

Figure 13:
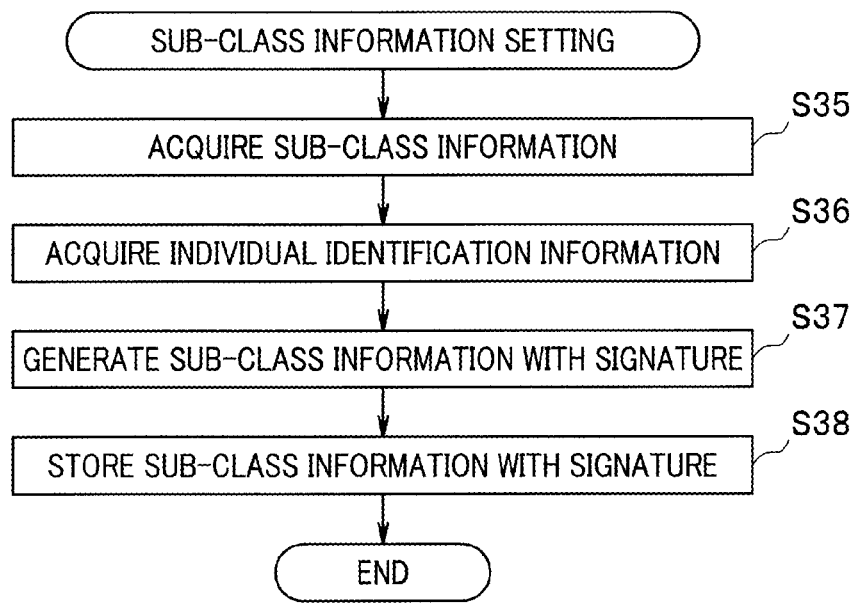
FIG. 13 is a flowchart illustrating processing of setting of sub-class information to a non-volatile memory 20.

FIG. 13 is a flowchart illustrating processing of setting sub-class information to the non-volatile memory 20. The sub-class information can be, for example, taken in to the semiconductor device module 1 via the terminal 17 in FIG. 8. Further, a command for setting the sub-class information to the non-volatile memory 20 can be provided to the semiconductor device module 1 via the terminal 16. Note that the sub-class information may be written in the non-volatile memory 20 before the semiconductor device module 1 is incorporated into the camera 30.

Note that, also in the present embodiment, the sub-class information and the command for setting the sub-class information to the non-volatile memory 20 may be acquired through any route. When the sub-class information is inputted via the terminal 17, the control unit 12 stores the sub-class information in the memory 15. When the command for setting the sub-class information to the non-volatile memory 20 is provided to the semiconductor device module 1 via the terminal 16, the control unit 12 acquires the sub-class information from the memory 15 in step S35.

The control unit 12 reads out the individual identification information stored in the IC specific information storage unit 14 in step S36, and signs the sub-class information using the individual identification information to generate sub-class information with signature (step S37). The control unit 12 stores the generated sub-class information with signature in the non-volatile memory 20 as a sub-class file (step S38).

Further, the sub-class information acquired in step S35 may be signed using the class information, and before generating the sub-class information with signature in step S37, it can be guaranteed that an executor of the sub-class information setting (FIG. 13) has authority of the class authentication by confirming that the class authentication of the acquired sub-class information is successful.

Figure 14:
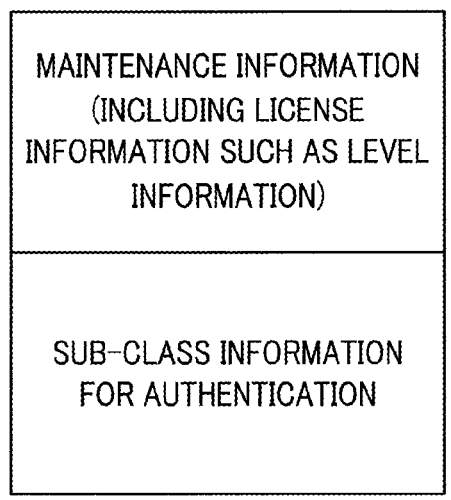
FIG. 14 is an explanatory diagram for explaining a sub-class file stored in the non-volatile memory 20.

FIG. 14 is an explanatory diagram for explaining the sub-class file stored in the non-volatile memory 20. As illustrated in FIG. 14, the sub-class file includes sub-class information for specifying the sub-class. Further, the sub-class file includes individual identification information for authentication.

Operation of the embodiment configured as described above will be explained next. The present embodiment is the same as the first embodiment in that before the user initially performs normal startup, for example, a license file based on initial data writing through, for example, execution of the initial maintenance mode by the manufacturer is generated, and the user performs normal startup by utilizing this license file. In the present embodiment, before the semiconductor device module is shipped to the user, a sub-class file including sub-class information signed using the individual identification information specific to each semiconductor device module 1 is stored in the non-volatile memory 20.

It is now assumed that the camera maker, or the like, updates the semiconductor device module 1 belonging to a predetermined sub-class within a predetermined class. The sub-class information is generated at the manufacturer, the camera maker, or the like, and the sub-class information of the semiconductor device module 1 which is desired to be updated is known to the camera maker, or the like. The camera maker, or the like, generates maintenance information for updating according to content of updating and signs the maintenance information for updating using the sub-class information of the sub-class to be updated to generate maintenance information with signature (maintenance information for updating with signature) and provides the maintenance information with signature to the user as a maintenance file for updating.

For example, the communication unit 32 of the camera 30 receives the maintenance file for updating from the camera maker, or the like, via a network which is not illustrated. The maintenance file for updating received by the communication unit 32 is supplied to the semiconductor device module 1 via the terminal 17. The control unit 12 stores the maintenance file for updating inputted via the terminal 17 in the memory 15.

The camera control unit 31 generates a mode signal for executing a maintenance mode according to, for example, user operation. This mode signal is provided to the semiconductor device module 1 via the terminal 16. The control unit 12 of the semiconductor device module 1 shifts the mode to the maintenance mode when the mode signal for executing the maintenance mode is inputted via the terminal 16.

For example, the control unit 12 determines whether or not the maintenance mode is designated in step S21 in FIG. 7, and, if the maintenance mode is designated by the mode signal, the control unit 12 shifts the processing to step S22, where the maintenance file for updating stored in the memory 15 is loaded.

In the present embodiment, in the subsequent step S31, it is determined whether or not the maintenance file for updating is signed using the sub-class information. When the maintenance information is signed using the class-information or the individual identification information, the control unit 12 shifts the processing to step S23. In this case, similar operation to the operation in the second embodiment is performed.

On the other hand, when the maintenance information is signed using the sub-class information, the control unit 12 shifts the processing to step S32 and authenticates the sub-class file. That is, the control unit 12 reads out the sub-class file stored in the non-volatile memory 20, reads out the individual identification information from the IC specific information storage unit 14, and authenticates the sub-class file using the individual identification information. If the sub-class file stored in the non-volatile memory 20 is not tampered, or the like, the authentication is successful, and the control unit 12 shifts the processing from step S33 to step S23 and authenticates the maintenance information using the sub-class information included in the sub-class file. Similar operation to the operation in the second embodiment is performed thereafter. In this manner, updating, or the like, is reliably performed at the semiconductor device module 1 belonging to the sub-class designated by the sub-class information for authentication in the maintenance file. Note that, while FIG. 11 illustrates an example where after the sub-class is authenticated in step S32, the maintenance file is authenticated in step S23, the sub-class may be authenticated in step S32 after the maintenance file is authenticated in step S23.

If the sub-class file stored in the non-volatile memory 20 is tampered, or the like, the control unit 12 determines that authentication is failed in step S33, finishes the processing, and does not perform authentication of the maintenance information and updating of the license file. By this means, updating, or the like, is not performed at non-license target equipment other than the semiconductor device module 1 in which the legitimate sub-class information is stored in the non-volatile memory 20.

As described above, in the present embodiment, because it is possible to provide the same advantages as those in the first and the second embodiments, and the sub-class information is stored in the non-volatile memory, it is possible to perform updating, or the like, in units of sub-class set within the class. Further, because the sub-class information stored in the non-volatile memory is signed using the individual identification information stored in the IC specific information storage unit, it is possible to reliably prevent abuse through tampering, or the like.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A semiconductor device module comprising:
   a function unit configured to implement a predetermined function;
   a specific information storage unit configured to store individual identification information and class information;
   a control unit configured to perform authentication processing of maintenance information with signature signed using the class information and generate license information with signature signed using the individual identification information, the license information being based on the maintenance information, and store the license information with signature in a non-volatile memory; and a register to which a setting value based on the license information is set by the control unit.

2. The semiconductor device module according to claim 1, wherein the control unit authenticates the maintenance information with signature read out from the non-volatile memory using the class information stored in the specific information storage unit.

3. The semiconductor device module according to claim 1, comprising:

the non-volatile memory storing the maintenance information with signature.

4. The semiconductor device module according to claim 1, wherein the function unit implements a function at a level based on the setting value set to the register.

5. The semiconductor device module according to claim 1, wherein the class information is information corresponding to a class of license specified by the license information.

6. The semiconductor device module according to claim 1, wherein the specific information storage unit is an information holding unit configured to hold information physically in the hardware.

7. The semiconductor device module according to claim 1, wherein the individual identification information and the class information are stored in the specific information storage unit upon manufacturing.

8. The semiconductor device module according to claim 1, wherein the control unit performs the authentication processing using an authentication program stored in the non-volatile memory.

9. The semiconductor device module according to claim 1, wherein the control unit performs authentication processing of the maintenance information with signature and generation and storage processing of the license information with signature during an initial maintenance mode, and sets the setting value based on the license information to the register during a normal mode.

10. The semiconductor device module according to claim 1, wherein, when a maintenance mode is designated after the license information with signature is written in the non-volatile memory, the control unit performs authentication processing of the maintenance information with signature signed using the class information or the individual identification information and generates license information with signature signed using the individual identification information, the license information being based on the maintenance information, to update the non-volatile memory.

11. The semiconductor device module according to claim 1, wherein, when sub-class information to be used to sign the maintenance information is inputted, the control unit generates sub-class information with signature by signing the inputted sub-class information using the individual identification information and stores the sub-class information with signature in the non-volatile memory.

12. The semiconductor device module according to claim 11, wherein the sub-class information is signed by the class information, and after the sub-class information is authenticated by the class information, the sub-class information is singed using the individual identification information.

13. The semiconductor device module according to claim 11, wherein, when a maintenance mode is designated after the sub-class information with signature is stored in the non-volatile memory, the control unit performs authentication processing of maintenance information with signature signed using the class information, the sub-class information or the individual identification information and generates license information with signature signed using the individual identification information, the license information being based on the maintenance information, to update the non-volatile memory.

14. The semiconductor device module according to claim 1, wherein the license information is used to limit a function of the function unit, and the setting value based on the license information is a setting value for limiting the function of the function unit.

15. A license setting method comprising:

reading out maintenance information with signature signed using class information;

reading out class information from a specific information storage unit and authenticating the maintenance information with signature;

generating license information with signature by signing license information based on the maintenance information using individual identification information read out from the specific information storage unit;

storing the generated license information with signature in a non-volatile memory; and setting a setting value based on the license information stored in the non-volatile memory to a register.

16. The license setting method according to claim 15, wherein the class information and the individual identification information are stored physically upon manufacturing of the specific information storage unit.

17. The license setting method according to claim 16, wherein authentication processing of the maintenance information with signature and generation and storage processing of the license information with signature are performed during an initial maintenance mode, and the setting value based on the license information is set to the register during a normal mode.

18. The license setting method according to claim 17, wherein when a maintenance mode is designated after the license information with signature is written in the non-volatile memory, authentication processing of the maintenance information with signature signed using the class information or the individual identification information is performed, and the license information with signature signed using the individual identification information is generated, the license information being based on the maintenance information, to update the non-volatile memory.

19. A non-transitory computer-readable recording medium having a license setting program recorded in the recording medium, the license setting program causing a computer to:
   read out maintenance information with signature signed using class information;
   read out the class information from a specific information storage unit and authenticate the maintenance information with signature;
   generate license information with signature by signing license information based on the maintenance information using individual identification information read out from the specific information storage unit;
   store the generated license information with signature in a non-volatile memory; and
   set a setting value based on the license information stored in the non-volatile memory to a register.

* * * * *